United States Patent [19]

Okuhara et al.

[11] 3,888,224

[45] June 10, 1975

[54] LIQUID FOOD PRESERVATION

[75] Inventors: Akira Okuhara; Masatoshi Saiki, both of Noda; Nobuo Saito, Naygareyama, all of Japan

[73] Assignee: Robert Bosch G.m.b.H., Stuttgart, Germany

[22] Filed: Oct. 26, 1972

[21] Appl. No.: 300,979

Related U.S. Application Data

[63] Continuation-in-part of Ser. No. 17,059, March 6, 1970, abandoned.

[30] Foreign Application Priority Data

May 30, 1969   Japan.............................. 44-41653
   Dec. 19, 1969  Japan............................ 44-101612

[52] U.S. Cl. .................... 426/126; 220/63; 220/64; 426/106; 426/131
[51] Int. Cl. ..................... B65d 25/14; B65d 25/34
[58] Field of Search .......... 426/131, 106, 262, 261, 426/392, 397, 398, 126; 220/64, 63

[56] References Cited
UNITED STATES PATENTS

| | | | |
|---|---|---|---|
| 1,679,543 | 8/1928 | Rector | 426/124 |
| 1,958,765 | 5/1934 | Perkins | 220/64 X |
| 2,027,270 | 1/1936 | Fellers | 426/262 X |
| 2,366,850 | 1/1945 | Gardner | 426/131 X |
| 2,421,154 | 5/1947 | Maier | 426/124 X |
| 2,428,526 | 10/1947 | Ostorheld | 220/64 |
| 2,530,413 | 11/1950 | Warth | 220/64 |
| 2,653,893 | 9/1953 | Romans | 426/398 X |
| 2,875,071 | 2/1959 | Malecki | 426/131 X |
| 3,070,256 | 12/1962 | Bremmer et al. | 220/64 |
| 3,134,682 | 5/1964 | Vogel et al. | 220/64 X |
| 3,152,717 | 10/1964 | Schwaiger | 220/64 |
| 3,627,543 | 12/1971 | Epstein | 426/262 X |

Primary Examiner—Frank W. Lutter
Assistant Examiner—Steven L. Weinstein
Attorney, Agent, or Firm—Edwin E. Greigg

[57] ABSTRACT

A container for preserving and decolorizing a melanoidin-containing liquid food, said container being lined with metallic Al, Mg, Mn or Zn so that the liquid food is in direct contact with one of these metals.

18 Claims, 1 Drawing Figure

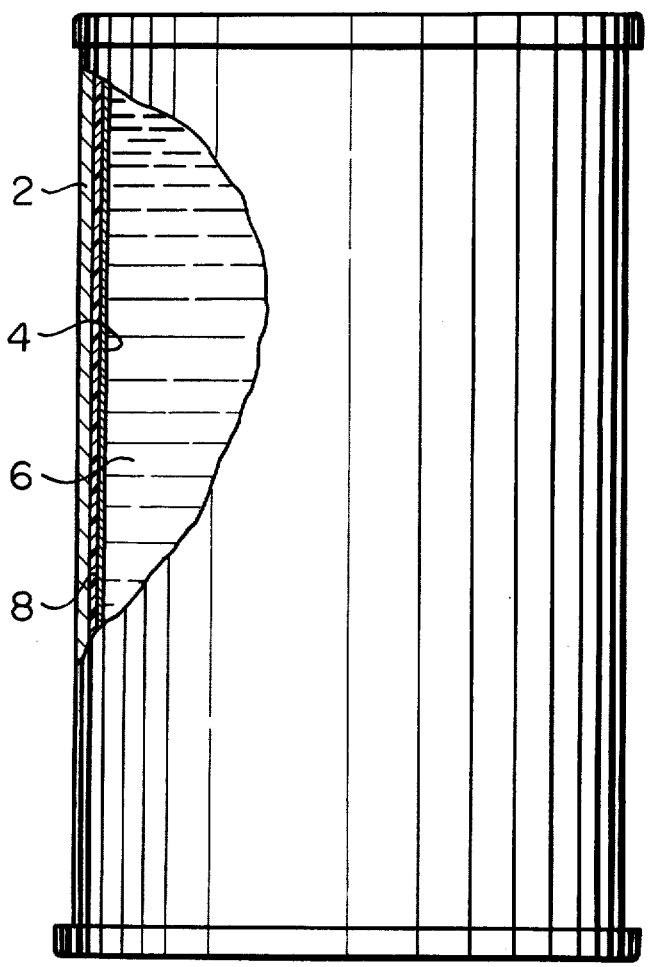

LIQUID FOOD PRESERVATION

This application is a continuation-in-part of copending application Ser. No. 17,059, filed Mar. 6, 1970, now abandoned.

The present invention relates to containers for preservation of liquid foods. The containers are capable of preventing or inhibiting the formation of melanoidins and decolorizing the melanoidins thereby preserving the preventing discoloration of the foods particularly during storage.

The term "liquid foods" in the present invention signify liquid foods such as, for example, soy sauce, amino acid solution, wines, vinegars and fruit juices; foods consisting of fruits and liquor such as syrup; or foods, a portion of which is liquor.

Ingredients of liquid foods are generally complicated and various chemical reactions are caused by oxygen contained in air or temperature. A most unfavorable reaction is browning caused after products are made. Reactions with respect to the browning include the so-called "oxidative browning reaction" in which oxygen contained in air participates and a non-oxidative browning reaction in which oxygen does not participate. These two reactions are not favorable and particularly, the former has a high reaction rate and results in remarkable deterioration in quality by oxidation.

Various means and processes have been tried, in the course of production, processing and packaging liquids, in preventing the formation of melanoidins or decolorizing abnormal coloring caused by melanoidins, with little success. Essentially the practice used for decolorizing melanoidins formed in the course of production or storage of the liquid foods before packing are almost limited to a process for the absorption-decolorization by the use of adsorbents such as active carbon, Japanese acid clay, decolorizing resin and the like.

Such absorbents suffer from such drawbacks so scents of foods other than color are also adsorbed, a large amount of adsorbents should be used, the separation of adsorbents after treatment is difficult, the regeneration operation of used adsorbents is required, and the like. Furthermore, these absorbents are not able to be used for decolorization of the liquid foods containing solid materials such as pulp in juice. It goes without saying that these absorbents cannot reduce the liquid foods.

Also, the use of antioxidants such as sulfurous acid, cysteine, ascorbic acid and the like to prevent formation of melanoidins has not been very effective whether added during the food processing step or in the package or container. Generally to produce any degree of effectiveness the antioxidants must be used in amounts which impair flavour and cause toxicity. Also it has been observed that with time they tend to accelerate reversely the browning and therefore are unsatisfactory as browning reaction inhibitors.

When foods are packaged and stored in containers the problem becomes even more toxing and severe.

Thus, in the case of packed foods, there often comes into the question the deterioration in quality in the course of storage or use which is caused by oxidation of air in the upper section of a container enclosed together with liquid foods at the time of being packed in the container or by the oxidation of air at the time of being opened. Especially, a plastic container made of polyvinyl chloride and the like which has recently been much used has a certain gas permeability in general and results in the marked deterioration in quality by oxidation as compared with containers made of metals and glass. Further, in the tin-cans, the tin face is remarkably corroded and the dissolving-out of toxic tin ions causes a difficult problem in food sanitation.

There are available tin cans coated further with lacquers in their inside surface under the object of preventing the dissolving-out of the tin. In a sort of this kind of containers, tin or silver is contained in the inside coated lacquer film or tin is partially exposed on the inside surface for preventing the oxidation of foods contained and the reduction in flavour. These means, however, are scarcely effective since, the tin is much dissolved out into foods.

It has been considered that a certain kind of metal ions inhibits the browning of foods. For example, Japanese Pat. No. 234,666 discloses that, when a metal having a smaller ionization tendency than that of iron such as silver, tin or the like or a compound (oxide) thereof is put in an internally coated film of tin-cans, the browning of foods contained therein is prevented but a metal having a larger ionization tendency than that of iron such as, for example, aluminum or its compound (oxide) has no such effect at all. From the process for producing tin-cans coated in their inside surfaces disclosed in said patent, it is understood that a metal having a larger ionization tendency than that of iron did not bring about the effect in itself since the metal is changed to oxide thereof or the surface of metal is changed to a strong oxidized coating in the course of baking at 200°C. for 15 minutes.

An object of the present invention is to provide a container capable of inhibiting the formation of melanoidins and decolorizing the melanoidins in liquid foods contained therein.

Another object of this invention is to provide a container capable of preventing the deterioration of liquid foods stored or packaged therein due to oxidation or oxidative browning reaction.

A further object of this invention is to provide metal containers for preventing liquid foods by coating the interior of said containers with a plastic or resin or lacquer and applying thereon a metal selected from the group consisting of Al, Mn, Mg and Zn so that said metals are in direct contact with the liquid food.

Still a further object of this invention is to provide a non-metallic container for preventing liquid food deterioration by coating said interior of said container with a metal selected from the group consisting of Al, Mg, Mn and Zn and optionally a plastic or resin coating can be applied prior to the metallic coating.

It has now been found that containers can be provided for inhibiting, preventing and/or decolorizing melanoidins in liquid foods stored or packaged therein by providing the interior of said container with a coating of metals selected from the group consisting of Al, Mg, Mn and Zn. The containers can be metallic or non-metallic and in case the container is metallic it is essential that between the interior wall of the metal container and the Al, Mg, Mn or Zn coating that a layer of plastic, resin or lacquer, which covers all the surface of said interior wall contacting with the liquid foods, separate the two, whereas in the case of non-metallic containers the intermediate plastic, resin or lacquer coating is optional. Thus, it has been found that color-changes in liquid foods such as soy sauce, amino acid solutions, Mirin, fruit juices, wines, vinegars, liquors and the like, due to the presence of so-called melanoidins formed by amino-carbonyl reaction and the oxidation with oxygen to accelerate browning reaction as well as non-oxidative browning reaction, can be prevented when packaged in containers the interior of which is provided with metals, as noted above. In essence, therefore, it has been discovered that preserving and improving the quality of liquid foods can be attained by packaging said foods in containers of the present invention.

Thus, an embodiment of the present invention is a process for preventing the deterioration in quality of liquid foods due to the inhibition of the oxidative and non-oxidative browning reaction by packing the liquid foods in a container having the inside surface on which one kind or more of the metals are disposed in advance partially or wholly to contact the liquid foods with the metals.

The container can comprise any type of vessel and a metal selected from the present metals, the metal being disposed on the inside surface of the vessel, whereby the oxidative or non-oxidative browning reaction in liquid foods can be inhibited.

Specifically, the metals which prevent the browning by contacting them with the liquid foods are magnesium, aluminum, manganese and zinc.

These metals are also harmless in food sanitation and gradually react with mixed air or an oxidizing substance in liquid foods to show a strong reductive power even in an extremely slight amount and maintain the effect for a long period of time. Among them, the most preferable metals are aluminum and zinc.

The container or vessel used to preserve liquid foods can be made of nonmetallic or metallic materials such as glass, paper, plastic, and metal such as tin-cans and the like. Where metal containers such as tin-cans are used the interior wall contacting with the liquid foods should be first coated with a plastic, resin or lacquer and thereafter the metals Al, Mg, Mn or Zn applied thereon or placed in the container by suitable means so that the liquid food to be preserved is in direct contact with the metal. In the case where the container is non-metallic the coating of plastic or lacquer is optional and generally not necessary.

Thus in the case where the metal is disposed to a container made of non-metallic materials such as glass and plastics, the metal can be directly disposed to its inside surface, but in the case of metal-made containers, it is disposed on a coating of non-metallic materials such as lacquers coated in advance on the metal face.

Preferably the inside liquid contacting surface of the container is disposed with the metal generally in an area of from 5 to 60 $cm^2$ per 100 ml. of the liquid food.

The single FIGURE of the drawing is a side elevation with parts broken away.

Referring more specifically to the drawing, there is provided a tin can 2 having an inner aluminum coating 4 on a non-metallic coating 8. A liquid food 6 is packed in the container.

As the adhering methods, there are available an ordinary coating method of metal powder and the adhesion method of metal foils. There are available a process for adhering metal powders or foils on a coating of a synthetic resin adhesive such as, for example, epoxy synthetic resin adhesives prepared on the inside surface of the containers. Particularly, aluminum and the like may be adhered in accordance with the vaporization process.

Aluminum cans have been used as containers for liquid foods, but in such cases the metal aluminum does not directly come in contact with the liquid foods, since the inside surface of the cans is covered and protected by the oxidized film, namely, alumite or lacquers which contact the liquid foods. In situations where the metal aluminum is directly in contact with the liquid foods, the aluminum becomes gradually dissolved and weakened due to acid attack, and thus becomes thinner and is finally perforated thus making it unable to be used as a container. On the other hand, in the present invention, such drawbacks do not arise, since only chemical effects of aluminum are utilized for reduction and decolorization of melanoidins.

Liquid foods containing melanoidins of the present invention can stand until the objective color is reached and the container may be open, but is preferably sealed and filled up with nitrogen gas and the like. With containers of the present invention the amount of metal to be consumed is varied depending upon the kind of liquid foods, the amount of melanoidins and the like, but the amount of dissolvingout thereof into the liquid foods does not exceed ca. 400 p.p.m. in maximum. Excess or any remaining metal, if required, can be removed by the treatment such as filtration and the like, and in the case where the coexistence of the metal ions is not preferred, it is necessary to remove them by an adequate means, for example, by the use of ion exchange resin and electrolysis. In many cases, however, the dissolving-out of the metal is slight in amount and the removal thereof is not required in almost all cases.

With respect to the shape of metals to be used, a preferable shape such as powder, foils, lump and plates may optionally be selected in accordance with the object. However, powder is the most preferable. By varying the kind of metals, the purity of metals, the pH of foods to be treated, the reaction temperature and the contact area, the reaction velocity can be regulated. When the reaction velocity is high, the foods are decolorized and when the same is low, there are brought about the prevention of the oxidation and browning and the inhibiting effect.

According to the present invention, it is possible to lower the color of liquid foods to the objective color in a simple manner.

Containers of the present invention inhibit the formation of melanoidins by having disposed therein the present metal in an adequate amount on a portion or the whole of the inside surface of a container in contact with liquid foods.

The present invention will be explained with reference to the following examples. In addition, a color intensity is determined by the absorbance at 500 m$\mu$ through a liquid layer of 10 mm. in thickness. Only in the case of soy sauce, the same is diluted by 10-folds to be treated. Further, controls are results of liquid foods without the addition of the present metal tested under the same condition.

EXAMPLE 1

300 ml. of raw soy sauce was put in a glass flask, 0.3 g. of metal powder was added thereto and the resultant was heated in nitrogen gas while stirring at 80°C. for 3 hours. After cooling, the resultant liquid was filtered to remove off an excess of metal. The color intensity of the resultant liquid was measured, the result of which is shown in Table 1.

Table 1

| Metal added | Color intensity |
| --- | --- |
| Control | 0.724 |
| Magnesium | 0.638 |
| Aluminum | 0.602 |
| Zinc | 0.539 |

EXAMPLE 2

200 ml. of raw soy sauce was put in a glass flask, 0.2 g. of metal powder was added thereto, and the resultant was heated in nitrogen gas while stirring at 60°C. for 3 hours. After cooling, the resultant liquid was filtered to remove off an excess of the metal, and the color intensity thereof was measured, the result of which is shown in Table 2.

Table 2

| Metal added | Color intensity |
| --- | --- |
| Control | 0.543 |
| Aluminum | 0.535 |
| Zinc | 0.415 |

EXAMPLE 3

200 ml. of concentrated apple juice was put in a glass flask, 0.2 g. of metal powder or foils were added thereto, and the resultant was heated in nitrogen gas while stirring at 60°C. for 3 hours. After cooling, an excess of the metal was removed. The result of measurement is shown in Table 3.

Table 3

| Metal added | Color intensity |
| --- | --- |
| Control | 0.789 |
| Aluminum powder | 0.643 |
| Aluminum foils | 0.716 |

EXAMPLE 4

300 ml. of a concentrated apple juice and aluminum foils were put in and enclosed in a container made of polyvinyl chloride, and shaken at 30°C. for one week. Thereafter, the color intensity was measured, the result of which is shown in Table 4.

Table 4

| *Area of aluminum foil added ($cm^2$) | Color intensity |
| --- | --- |
| 0 | 1.457 |
| 50 | 1.330 |
| 100 | 1.300 |
| 150 | 1.279 |
| 200 | 1.235 |
| 250 | 1.163 |
| Initial | 1.278 |

*The area of aluminum foil was shown in sum of area of both the two faces

EXAMPLE 5

Pasteurized soy sauce was subjected to the treatment in the same manner as in Example 4. The result is shown in Table 5.

Table 5

| Area of aluminum foil added ($cm^2$) | Color intensity |
| --- | --- |
| 0 | 0.887 |
| 50 | 0.634 |
| 100 | 0.618 |
| 150 | 0.611 |
| 200 | 0.613 |
| 250 | 0.613 |
| Initial | 0.774 |

EXAMPLE 6

300 ml. of soy sauce contained 0.01% (weight per volume) of metal powder was put in a container made of polyvinyl chloride, stored at 30°C. for one week, and then freed from an excess of the metal by filtration. The color intensity thereof was measured, the result of which is shown in Table 6.

Table 6

| Metal added | Color intensity |
| --- | --- |
| Zinc | 0.990 |
| Aluminum | 0.982 |
| Control | 1.068 |
| Initial | 0.995 |

EXAMPLE 7

300 ml. of browned white wine was added with 50 $cm^2$ of aluminum foil, put in a container having a volume of 300 ml. which is made of polyvinyl chloride, and shaken at 30°C. for one week. The result is as follows:

| | Color intensity |
| --- | --- |
| Initial | 0.549 |
| After a week | 0.523 |

EXAMPLE 8

Adding 0.1% (weight per volume) of zinc powder to concentrated apple juice having an initial color intensity of 1.254 and stirring the resultant mixture for 3 days, there was obtained the juice having a color intensity of 0.668. The unreacted zinc powder was removed and the zinc content was measured to be 300 p.p.m. After electrolyzing the resultant liquid at 55 to 60 mA for 2 hours by the use of platinum as an anode and mercury as a cathode, the zinc content was again measured to be 3 to 4 p.p.m. From said result, it was understood that almost all of zinc was removed.

EXAMPLE 9

1 g. of zinc powder was added to 1 litre of remarkably colored concentrated apply juice (color intensity: 1.756), the resultant was stirred for 60 hours, and then the unreacted zinc powder was removed by filtration. The resultant color intensity was 0.888. Said decolorized liquid was passed through a column of 150 ml. in Dowex A.1 H⁺ type (tradename for a weak acidtype cation exchange resin, which is one kind of chelate resin and an addition compound of a styrene-divinylbenzene copolymer with imino-2-acetic acid, manufactured by Dow Chemical Co., U.S.A.). Zinc content in reduced liquid foods was 230 p.p.m. and that of treated with said column was 7.5 p.p.m.

EXAMPLE 10

Adding 40 cm$^2$. in both face areas of aluminum foil to 1 litre of pasteurized soy sauce packed in a glass bottle and standing the resultant mixture at 30°C. for 2 months, there were carried out the measurement of color intensity and a sensory evaluation test. The result is as follows:

| | Color intensity |
|---|---|
| Initial | 0.817 |
| Preserved for 2 months after added with Al. | 0.790 |
| Control (preserved for 2 months) | 0.864 |

Sensory evaluation test

| | Flavour | Taste |
|---|---|---|
| Control | — | — |
| Al addition | 0.39 | 0.11 |
| Significant test | — | — |

The marking was made in such a manner that no difference between the two is represented by 0, the remarkable difference therebetween is represented by 5 and 4 stages are provided between them. Eighteen persons were tested. The result showed that significant difference between the two was not found except for the color intensity.

EXAMPLE 11

Vinyl chloride synthetic adhesives were coated on the inside surface of a plastic container having a volume of 300 ml. in an area shown in Table 7 and aluminum powder was spread over the resultant surface. After drying and solidifying the coating, the aluminum powders not fixed thereon were removed by washing with water. Packing and sealing 300 ml. of soy sauce in the resultant container and standing at 30°C. for one month, there was measured the color intensity (initial color intensity: 0.780). The result is shown in Table 7.

Table 7

| Area adhered (cm$^2$) | Color intensity | Area adhered | Color intensity |
|---|---|---|---|
| Control (0) | 0.982 | 90.0 cm$^2$ | 0.642 |
| 14.4 | 0.882 | 99.0 cm$^2$ | 0.664 |
| 23.4 | 0.828 | 130.0 cm$^2$ | 0.660 |
| 45.0 | 0.774 | 180.0 cm$^2$ | 0.642 |

As is obvious from Table 7, aluminum has a remarkable preventing effect against the browning and particularly the contact area in the vicinity of 23.4 to 45.0 cm$^2$ for 300 ml. of soy sauce preferred for maintaining the initial color intensity thereof.

EXAMPLE 12

A mixture prepared by dissolved 20% (weight by volume) of polystyrene in ethyl acetate and adding a small amount of aluminum powder to the resultant solution was coated on the inside surface of a plastic container having a volume of 300 ml. and dried and solidified. 300 ml. of concentrated apple juice was packed and sealed in the resultant container, stood at 30°C. for 15 days or 30 days, and then measured in the color intensity. (Initial color intensity: 0.674). The result is shown in Table 8.

Table 8

| Area coated (cm$^2$) | 15 days | 30 days |
|---|---|---|
| Control (0) | 0.918 | 1.054 |
| 32.1 | 0.732 | 0.864 |
| 56.3 | 0.686 | 0.754 |
| 76.8 | 0.670 | 0.746 |

As is obvious from Table 8, the effect for inhibiting the browning made by the coating prepared by mixing aluminum power is remarkable.

EXAMPLE 13

Aluminum foil was adhered on the inside surface of a polyvinyl chloride container having a volume of 300 ml. by an adhesive in an area shown in Table 9. 300 ml. of soy sauce was packed and sealed in the resultant container, stood at 30°C. for about one month, and then measured in the color intensity (Initial color intensity: 0.990). The result is shown in Table 9

Table 9

| Area adhered (cm$^2$) | Color intensity |
|---|---|
| Control (0) | 1.146 |
| 30 | 1.010 |
| 50 | 0.912 |

As is obvious from Table 9, the effect for inhibiting the browning reaction made by the adhesion of aluminum foil was remarkable, and particularly such favourable result was obtained that the initial color intensity was approximately maintained by the adhesion of aluminum foil having an area of 30 cm$^2$.

EXAMPLE 14

A mixture prepared by dissolving polystyrene in ethyl acetate in the same manner as in Example 12 and adding a small amount of zinc powder thereto was coated in an amount of about 50 cm$^2$ (15 to 30 mg. calculated as zinc powder) on the inside surface of a plastic container having a volume of 300 ml., and then dried. 300 ml. of soy sauce was packed and enclosed in the resultant container, shaken at 30°C. for one week, and then measured in the color intensity (Initial color intensity: 0.924). The result is shown in Table 10.

Table 10

| | Color intensity |
|---|---|
| Control | 0.964 |
| Zinc | 0.920 |

As is obvious from table 10, the coating containing zinc powder had a remarkable effect for inhibiting the browning reaction and could prevent the deterioration in quality.

EXAMPLE 15

In the same manner as in Example 12, a mixture prepared by dissolving polystyrene in ethyl acetate and adding a small amount of zinc powder thereto was coated on the inside surface of a container so as to contact with liquid foods to be contained therein, and then dried and solidified. 300 ml. of soy sauce (initial color intensity: 0.924) was packed and sealed in the resultant container, stood at 30°C. for 28 days, and then measured in the color intensity. The result is shown in Table 11.

Table 11

| Area coated (cm²) | Color intensity |
|---|---|
| 75 | 1.004 |
| 150 | 0.978 |
| Control (0) | 1.060 |

As is obvious from Table 11, there was brought about a remarkable effect.

EXAMPLE 16

Aluminum foil was adhered on the inside surface of a 6-1 tin can which was coated in advance with a lacquer in an area as shown in Table 12 so as to contact with soy sauce to be packed. 6 Liters of soy sauce was put in the resultant container and allowed to stand at 30°C. 500 ml. of the soy sauce was taken out in every one week after the lapse of 17 days of said storage and the color intensity thereof was measured (Initial color intensity: 0.818). The result is shown in Table 12.

Table 12

| Area adhered (cm²) | Preservation day | | | |
|---|---|---|---|---|
| | 17 | 21 | 28 | 35 |
| Control (0) | 0.924 | 0.931 | 1.010 | 1.024 |
| 50 | 0.924 | 0.918 | 0.982 | 1.004 |
| 75 | 0.912 | 0.912 | 0.950 | 0.964 |
| 100 | 0.894 | 0.900 | 0.956 | 0.970 |
| 200 | 0.888 | 0.882 | 0.924 | 0.938 |
| 400 | 0.844 | 0.850 | 0.850 | 0.864 |

As is obvious from Table 12, the adhesion of aluminum brought about such a favourable result as to be remarkable in the effect for inhibiting the browning reaction, to prevent the deterioration in quality and to be possible to approximately maintain the initial color intensity by the adhesion of aluminum foil having an area of 400 cm².

EXAMPLE 17

20 or 30 cm² of aluminum foil was adhered on the inside surface of a paper container having a volume of 1 litre so as to contactt with soy sauce to be packed. 1 Litre of pasteurized soy sauce was packed and sealed in the resultant container, allowed to stand and preserved at 30°C. for two months, and measured in the color intensity during that period (Initial color intensity: 0.828). The result is shown in Table 13.

Table 13

| Area adhered (cm²) | After one month | After two months |
|---|---|---|
| Control (0) | 0.906 | 1.010 |
| 20 | 0.876 | 0.906 |
| 30 | 0.828 | 0.858 |

As is obvious from Table 13, the effect for inhibiting the browning reaction was remarkable and the deterioration in quality was possible to be prevented.

EXAMPLE 18

24 cm² of adhesive was coated on the inside surface of a glass container having a volume of 360 ml. so as to contact with the liquid to be packed and aluminum powder was placed thereon before said coating is dry. After drying and solidifying, aluminum powder which was not adhered thereon was removed by washing with water. 360 ml. of pasteurized soy sauce was packed and sealed in the resultant container, allowed to stand at 30°C. for 2 months, and then measured in the color intensity (Initial color intensity: 0.774). The result is shown in Table 14.

Table 14

| | After one month | After two months |
|---|---|---|
| Control | 0.870 | 1.040 |
| Adhered with Al powder | 0.818 | 0.970 |

As is obvious from the above Table, the effect for inhibiting the browning was remarkable.

What is claimed is:

1. A metallic container containing melanoidin-containing liquid food and suitable for preserving and decolorizing melanoidin-containing liquid food contained therein, said container having an intermediate coating consisting of non-metallic material which covers all the interior surface of said container and an interior coating thereon of at least one metal selected from the group consisting of Al, Mn, Mg, and Zn, said metal being in direct contact with the melanoidin-containing liquid food.

2. The container of claim 1 wherein the metal on the nonmetallic coating is aluminum.

3. The container of claim 1 which is a tin-can having an intermediate plastic or lacquer coating, and the metal on said interior coating is aluminum powder.

4. The container of claim 1 which is a tin-can having an intermediate plastic or lacquer coating, and the metal on said interior coating is zinc powder.

5. The container of claim 1 which is a metal container and an intermediate plastic or lacquer coating.

6. The container of claim 1 wherein said metal covers an area of the container from 5 to 60 cm² per 100 ml. of the liquid food.

7. The container of claim 6 which is a tin-can, the intermediate coating is a lacquer coating and the metal is Al powder.

8. The container of claim 6 which is a tin-can, the intermediate coating is a lacquer coating and the metal is Zn powder.

9. A tin-can containing melanoidin-containing liquid food and susceptible to food deterioration and tin dissolution, the food contacting surface of said tin-can having intermediate coating consisting of non-metallic material and an interior coating of a metal selected from the group consisting of Al, Mn, Mg and Zn, said metal being in direct contact with the melanoidin-containing liquid food.

10. The tin-can of claim 9 wherein the intermediate coating is a lacquer coating and the metal is Al or Zn.

11. The tin-can of claim 9 wherein the intermediate coating is a synthetic resin and the metal is Al or Zn powder.

12. The tin-can of claim 11 containing a liquid food juice.

13. A non-metallic container containing melanoidin-containing liquid food and suitable for preserving and decolorizing melanoidin-containing liquid food contained therein, said container having on its interior surface at least one metal selected from the group consisting of Al and Zn, said metal being in direct contact with the melanoidin-containing liquid food.

14. The container of claim 13 wherein said container is made of glass, plastic or paper and the metal is in foil form.

15. The container of claim 13 wherein said container is made of glass, plastic or paper and the metal is in powder form. 4

16. A non-metallic container containing melanoidin-containing liquid food and suitable for preserving and decolorizing melanoidin-containing liquid food contained therein, said container having on its interior surface at least one metal selected from the group consisting of Al, Mn, Mg and Zn, said metal being in direct contact with said melanoidin-containing liquid food.

17. The container of claim 16 wherein said non-metallic material is selected from the group consisting of glass, plastic and paper.

18. The container of claim 17 wherein the inside liquid contacting surface of the container is disposed with the metal in an area of from 5 to 60 $cm^2$ per 100 ml of the liquid food.

* * * * *